Sept. 9, 1969  J. L. LASS  3,466,226
NUCLEAR FUEL ELEMENT
Original Filed Jan. 26, 1966  4 Sheets-Sheet 1

INVENTOR.
James L. Lass
BY
Charles L3 Curry

Sept. 9, 1969
J. L. LASS
3,466,226
NUCLEAR FUEL ELEMENT

Original Filed Jan. 26, 1966

INVENTOR.
James L. Lass

BY
Charles H3 Curry

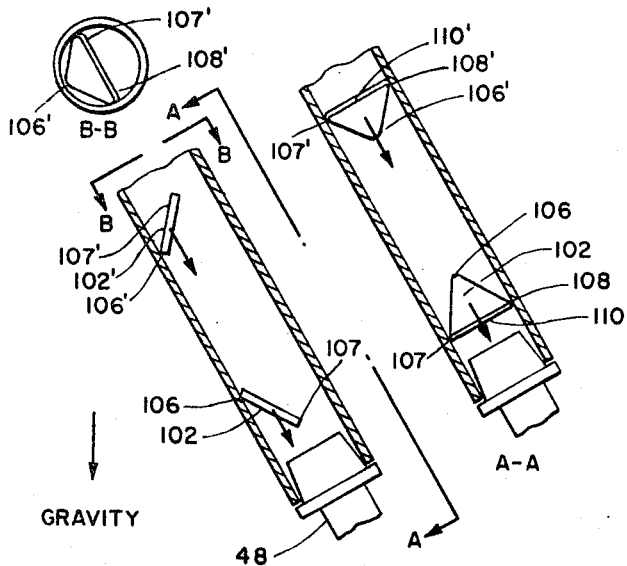
GRAVITY
(1)
FIG. 10A
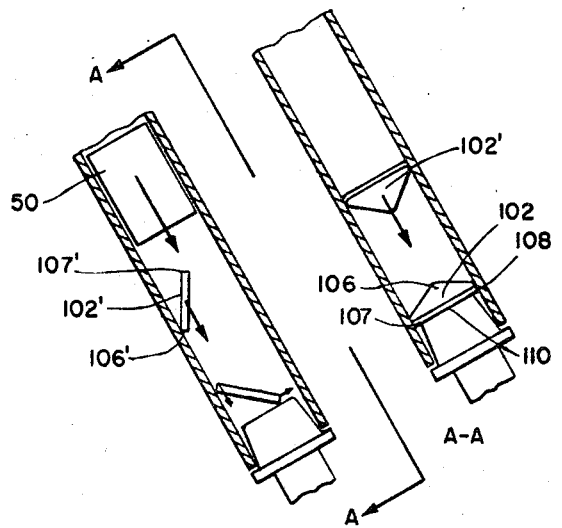
(2)
FIG. 10B
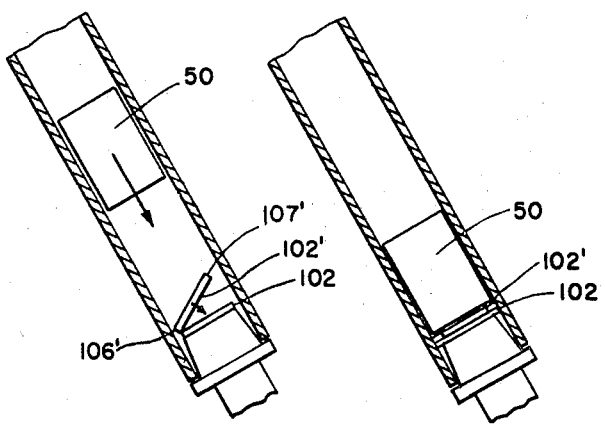
(3)
FIG. 10C
(4)
FIG. 10D
INVENTOR.
James L. Lass
BY
Charles J. S. Curry

United States Patent Office 3,466,226
Patented Sept. 9, 1969

3,466,226
NUCLEAR FUEL ELEMENT
James L. Lass, San Jose, Calif., assignor to General Electric Company, a corporation of New York
Continuation of application Ser. No. 523,060, Jan. 26, 1966. This application Aug. 25, 1967, Ser. No. 667,878
Int. Cl. G21c 3/10
U.S. Cl. 176—68             9 Claims

ABSTRACT OF THE DISCLOSURE

A nuclear fuel element is disclosed in which a thin unbonded metal wafer is included between the fuel material and a cladding tube closure such as an end plug or an inter-segment connector. The wafer introduces a second thermal interface between the wafer and end plug or connector, in addition to the thermal interface between the fuel and the wafer. This serves to prevent overheating and the resulting excessive volumetric expansion of the end plug or connector during reactor operation.

---

This application is continuation of U.S. patent application Ser. No. 523,060, filed Jan. 26, 1966 and now abandoned.

The release of large amounts of energy through nuclear fission reactions is now quite well known. In general, a fissionable atom such as $U^{233}$, $U^{235}$, $Pu^{239}$, $Pu^{241}$ absorbs a neutron in its nucleus and undergoes a nuclear disintegration. This produces on the average two fission products of lower atomic weight with great kinetic energy, and several neutrons also of high energy. For example, the fission of $U^{235}$ produces a light fission product and a heavy fission product with mass numbers ranging between 80 and 110 and between 125 and 155 respectively, and an average of 2.5 neutrons. The energy release approaches 200 mev. (million electron volts) per fission.

The kinetic energy of the fission products is quickly dissipated as heat in the nuclear fuel. If after this heat generation there is at least one net neutron remaining which induces a subsequent fission, the fission reaction becomes self-sustaining and the heat generation is continuous. The heat is removed by passing a coolant through heat exchange relationship with the fuel. The reaction may be continued as long as sufficient fissionable material exists in the fuel to override the effects of the fission products and other neutron absorbers which also may be present.

In order to maintain such fission reactions at a rate sufficient to generate useful quantities of thermal energy, nuclear reactors are presently being designed, constructed, and operated in which the fissionable material is contained in fuel elements which may have various shapes, such as plates, tubes or rods. These fuel elements are usually provided on their external surfaces with a corrosion-resistant non-reactive cladding which contains no fissionable or fertile material. The fuel elements are grouped together at fixed distances from each other in a coolant flow channel or region as a fuel assembly, and sufficient fuel assemblies are combined to form the nuclear reactor core capable of the self-sustained fission reaction referred to above. The core is usually enclosed within a reactor vessel.

The fuel element with which the present invention is primarily concerned includes an elongated tube or clad, either of the continuous or segmented type, containing a fissionable material such as uranium dioxide ($UO_2$). This fuel material is typically in the form of pellets placed end to end in the tube; however, it may be in the form of a powder or particles. The upper end of the tube includes a plenum chamber which is provided to collect fission product gases which are given off by the fuel material during operation of the nuclear reactor. The upper and lower ends of the tube are respectively sealed by welding upper and lower end plugs to the tube or clad to prevent fission product gas from escaping the fuel element and to prevent water from entering the tube.

In order to increase the exposure lifetime of the fuel elements in the reactor it is desirable to minimize mechanical stress concentrations that may exist in the fuel elements. Mechanical stress concentrations often occur when there is unequal expansion of adjacent fuel element components. In certain instances, this unequal expansion may be accommodated by providing appropriate clearance between these components. This may be achieved, for example, between the fuel clad and the fuel pellets by providing a clearance that is sufficient to permit unimpeded expansion of the fuel pellets.

However, the above approach is not possible in those regions of the fuel element where thermal expansion clearances are not permissible. Such regions exist, for example, where it is necessary to weld or otherwise connect mating parts. This situation had existed in the fuel elements with which the present invention is concerned both at the bottom end plug region and at the segment inter-connection regions. During reactor operation it was found that the nuclear fuel pellets heated the clad and the bottom end plug such that the volumetric average temperature of the end plug was considerably greater than the volumetric average temperature of the clad. Therefore, the radial expansion of the end plug was greater than the radial expansion of the clad by an amount that was sufficient to cause undesirable stress concentrations in the interconnecting weld. This led to the formation of cracks or openings in the weld which exposed the fuel and fission products contained within the fuel elements to the coolant of the reactor. Upon the occurrence of this condition not only must the fuel elements be replaced but the coolant may carry radioactive material released from the fuel elements and therefore contaminate various parts of the reactor and coolant circuit. This differential thermal expansion is greater at the coolant inlet end of the fuel since this region of the fuel element is maintained at the coolest temperature. However, it also exists at the segment interconnection regions of a segmented fuel element. Various shapes of end plugs, tube thicknesses and materials have been used in attempting to minimize these stress concentrations; however, the present invention has been found more successful than have these alternative approaches.

Briefly, the present invention provides a method for minimizing the above-described differential thermal expansion both at the bottom end plug region and at the segment inter-connection regions. At the bottom end plug region, for example, this is achieved by disposing at least one thermal wafer between the bottom fuel pellet and the bottom end plug. This reduces the heat transfer rate from the fuel pellet to the bottom end plug thereby decreasing the volumetric average temperature of the bottom end plug to be substantially equal to the volumetric average temperature of the fuel element clad to which the bottom end plug is connected. It has been found that sufficient temperature drop can be obtained using thermal wafers made of a metal and still provide an effective thermal barrier. Only a small part of this temperature drop exists in the metal thermal wafers themselves since metal has a high heat conductivity. However, a large part of the temperature drop is believed to be due to thermal interface regions or gaps respectively formed between the fuel pellet and wafer and between the bottom end plug and the wafer. (When two or more thermal wafers are used thermal interface regions are formed between adjacent wafers.) This is based on the premise that these thermal interface regions are filled with helium during initial operation of the fuel element in the reactor and then subsequently with helium and fission gases which are released from the fuel material. These gases have low heat conductivity relative to that of the metal thermal wafers, clad, and end plugs, and therefore the interface regions act as an extremely effective heat barrier.

The preferred shape of the thermal wafer of the present invention is that of an equilateral triangle having each of the apexes rounded. Preferably the clearance between the wafer and the inside diameter of the fuel element tube is relatively small. In addition, the thermal wafers are made relatively thin so that several may be stacked to provide a greater number of gas filled heat barrier gaps, due to the thermal interfaces.

In addition, the triangular thermal wafer shape is selected such that when inserted into the fuel rod clad tube during the fuel loading cycle, they ride down the tube and rest flat against the bottom end plug. Because of the triangular shape and the clearance between the wafer and the clad tube inside diameter it is unlikely for the wafer to rest in any other position than flat against the inside surface of the end plug. This assures consistent fuel column heights within each fuel element since the bottom fuel pellet will not be excessively spaced from the bottom end plug as would be the case if the wafer came to rest in a vertical or "cocked" position. This also prevents breaking the fuel pellet which may occur if the bottom pellet strikes the thermal wafer in a vertical or cocked position during the loading operation.

The subject matter which is regarded as the invention is particularly pointed out and distinctly claimed in the concluding portion of the specification. The invention, however, both as to its organization and operation, together with further objects and advantages thereof, may best be understood by reference to the following description taken in conjunction with the accompanying drawings in which:

FIGURES 10A through 10D illustrate the loading sequence of thermal wafers into the fuel element during assembly.

Figure 1:
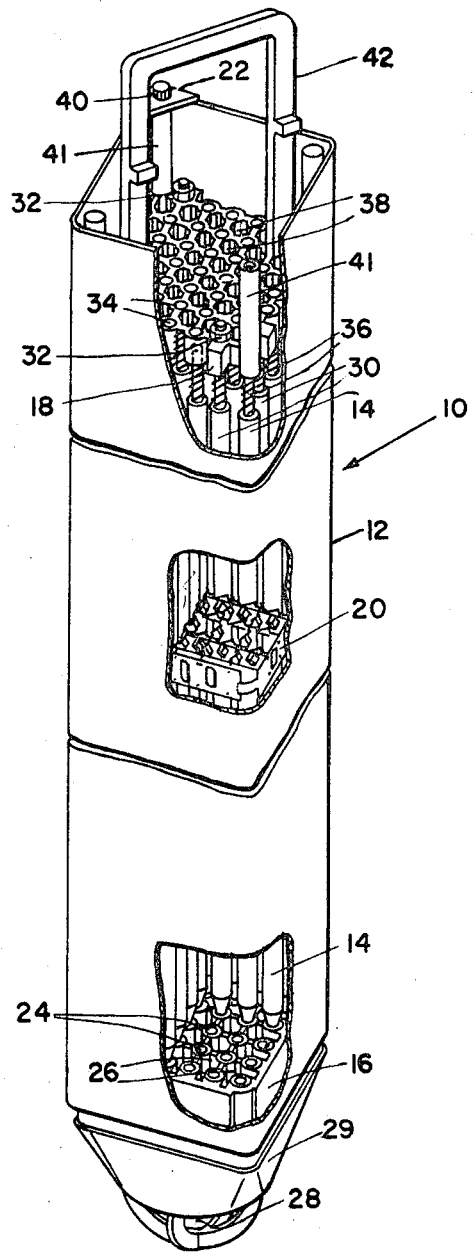
FIGURE 1 is an isometric view, in partial cross section, of a fuel assembly which incorporates the fuel elements made in accordance with the present invention.

In FIGURE 1 is illustrated a typical fuel assembly which incorporates the fuel elements made in accordance with the present invention. Fuel assembly 10 generally consists of open ended tubular flow channel 12, fuel elements 14, lower tie plate 16, upper tie plate 18, and fuel element spacer devices 20. Tubular channel 12 has a substantially square cross-section with the upper end having corner members 22 which support the channel after it has been inserted over the fuel elements. Fuel elements 14 extend through and are supported in spaced relation by a plurality of fuel element spacer devices 20 which rest against the interior surface of tubular channel 12. These fuel element spacer devices are separated from one another a predetermined distance along the bundle, for example, one and one-half feet, and are connected to one or more of the fuel elements to prevent longitudinal movement. These connections may be achieved by various means such as the attachment of locking devices at these same predetermined distances. An example of such an arrangement will be hereinafter described with respect to the segmented fuel element shown in FIGURE 2.

Each fuel element 14 comprises an elongated tube containing a fissionable fuel material such as enriched uranium dioxide ($UO_2$). The fuel material is typically in the form of high density pellets placed end to end in the tube; however, it may be in the form of high density powder or particles which are compacted to a bulk density approaching the theoretical density of the material. Each end of the tube is sealed by means of an end plug to prevent the coolant from contacting the fuel and to prevent fission products from escaping the fuel element. As illustrated in FIGURE 1, there are a plurality of such fuel elements, and in a typical arrangement, all but one of these fuel elements will consist of continuous, non-segmented tubes. However, one of the fuel elements, typically located near the center of the bundle, will be segmented and include locking devices at each connection to capture spacer devices 20 in their proper positions.

The lower ends of the fuel elements are supported by lower tie plate 16 and register with receptacles 24 which are formed part way through the tie plate. Openings 26 are positioned adjacent these receptacles 24 and communicate directly with lower opening 28. The lower end of tubular channel 12 fits down around the upper end of the tie plate. The lower end of the tie plate has a tapered transition fixture terminating in an open nosepiece 29 of circular cross section and is supported by the internal structure of the reactor. When the fuel assembly is mounted in the reactor, lower opening 28 communicates with a supply chamber containing a source of coolant such as water. Several fuel elements, such as those denoted by reference numeral 30, are positioned in the corners and have threaded extensions which extend through upper tie plate 18 and are secured to the plate by means of nuts 32. Fuel rod support receptacles 34 are formed through the upper tie plate and receive the upper ends of the fuel rods. Compression springs 36 are provided to maintain a load, which is determined by the torque applied to nuts 32, between upper tie plate 18 and the upper shoulder of fuel elements 14. Openings 38 are provided in upper tie plate 18, between receptacles 34 receiving the fuel element ends, to communicate the interior of the fuel assembly with the discharge chamber of the reactor. Tubular channel 12 is held in place by bolts 40, which are inserted through openings provided in corner members 22, which register with threaded extensions 41 of upper tie plate 18. Upper tie plate 18 is also provided with a handle 42 which is used to raise and lower fuel assembly 10.

While the above-described fuel assembly may be used in various types of nuclear reactors, it is particularly suited for use with boiling water moderator-coolant type nuclear reactors. During operation of a typical boiling water reactor in which the fuel assembly may be employed, the coolant is introduced through lower opening 28, through openings 26 and upward within channel 12 where it surrounds and flows longitudinally along the exterior surfaces of fuel elements 14. As the coolant flows upwards it removes heat from the fuel elements and therefore increases in temperature and finally converts to wet steam, having a quality of 10%, for example. This wet steam then flows through openings 38 in upper tie plate 18 which discharges into a discharge chamber within the reactor. The discharge chamber receives wet steam from a plurality of fuel assemblies which make up the reactor core. Wet steam from the discharge chamber is then dried and transmitted to a steam consuming device such as a turbine. The condensed steam from the steam consuming device may then be returned to the above-mentioned supply chamber.

Figure 2:
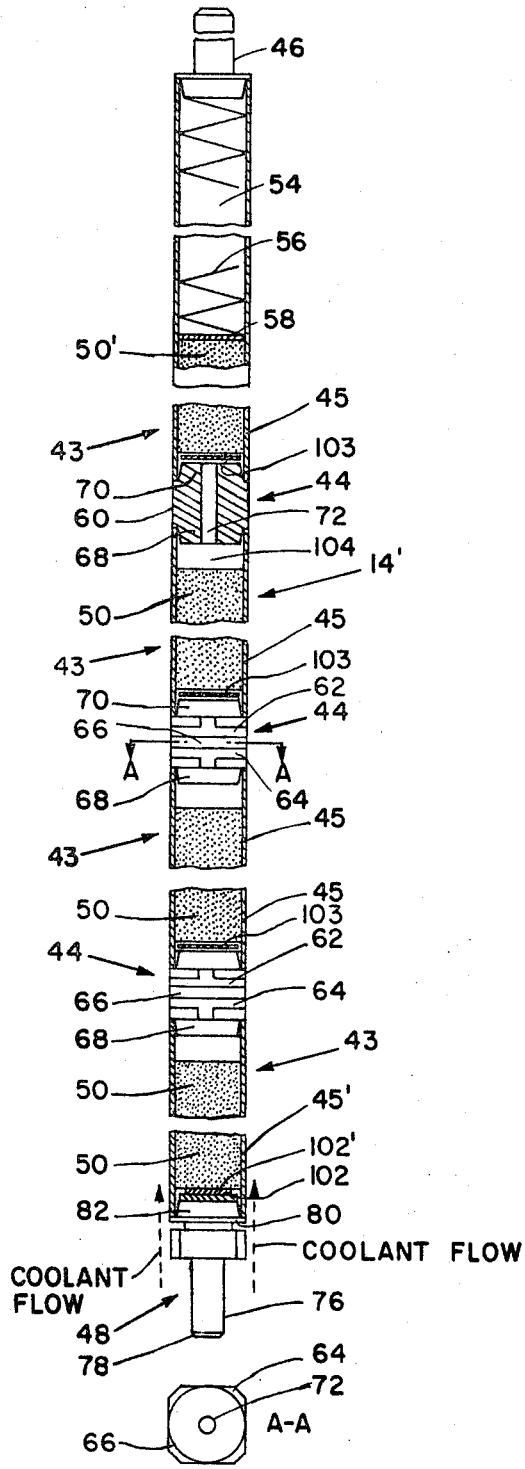
FIGURE 2 is a side elevation, in partial cross section, of a segmented fuel element incorporating the thermal wafers made in accordance with the present invention.

In FIGURE 2 is illustrated the segmented fuel element 14' made in accordance with the present invention. This segmented fuel element consists of a plurality of segments 43 which are interconnected by connectors 44. Each segment includes an elongated cylindrical clad tube 45. This tube may be made of many different materials; however, it is preferably made of zirconium, since this material has a low neutron capture cross-section. The top end of the fuel element is closed by means of top end plug 46 and bottom end plug 48, both of which may also be made of zirconium. These end plugs are respectively welded or fused to the opposite ends of clad tube fuel element 14' to prevent the reactor coolant from contacting the fuel and to prevent fission products from escaping the fuel element. Disposed within tube 45 of each of the segments is a fuel material such as uranium dioxide. The fuel illustrated in the fuel element of FIGURE 2 is in the form of pellets 50 which are placed end to end in the tube. It is to be understood, however, that the fuel may be of any nuclear type such as powder or particles.

Fuel element 14' is also provided with a plenum chamber 54 which collects fission product gases given off by the nuclear fuel during operation in the nuclear reactor. The volume of this chamber is made large enough to accommodate at reasonable pressure fission product gases which are expected to be released by the fuel during its anticipated life cycle in the nuclear reactor. Plenum spring 56 is disposed in plenum chamber 54 and forces pellets 50', in the upper segment, in facial contact with one another and typically exerts a force of about five pounds. This plenum spring is preferably made of Inconel-X, steel, or other material having suitable spring characteristics and preferably has a helical configuration with the outside diameter being less than the inside diameter of the tube. By providing only a small clearance between spring and tube, the spring may help support the adjacent plenum tube from the high pressures which may be exerted against the exterior surface of the tube by the surrounding medium within the reactor. A flat circular wafer 58 is inserted between the bottom end of spring 56 and the upper end of pellet 50' to prevent fuel particles or chips from entering the plenum chamber and distribute spring load uniformly against the undermost pellet.

Connectors 44 are generally of cylindrical cross-section and have a cylindrical center section 60, having an outside diameter about equal to the outside diameter of tube 45, and include two spaced apart generally square collars 62 and 64 forming a groove 66 therebetween. The outer section of each of the four corners of each of the collars is removed, as shown in section A—A of FIGURE 2, to permit insertion into the previously mentioned spacer. Rotation of the segmented fuel rod through a fixed angle, for example, 45 degrees, causes grooves 66 to capture corresponding parts of the associated spacers and thereby lock the spacers in position. Extending from center section 60 are frusto-conical sections 68 and 70 that are inserted into tubes 45 of adjacent segments 43. An opening 72 is provided in connectors 44 to permit flow of fission gases from the various segments to plenum chamber 54 and to equalize the pressure in the fuel element.

Figure 5:
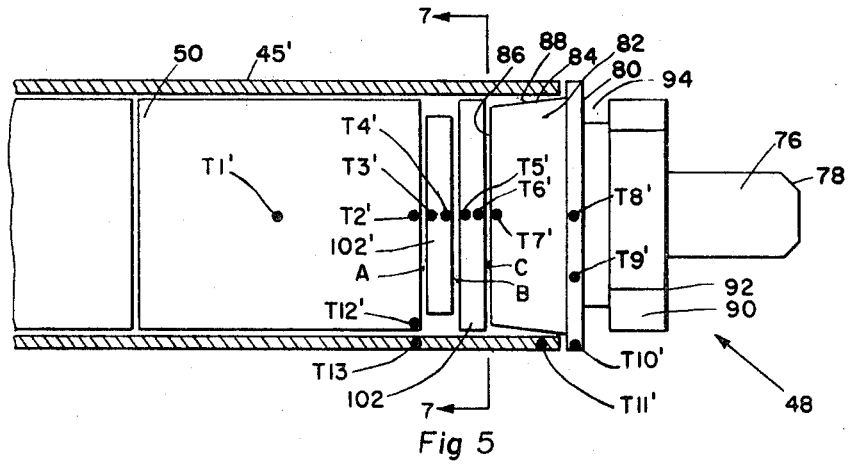
FIGURE 5 is an enlarged sectional view of the bottom end of the fuel element of FIGURE 2 and includes the thermal wafers made in accordance with the present invention.

An important aspect of the present invention is directed to the unique association between bottom end plug 48, the bottom end of the bottom segmented tube 45', thermal wafers 102 and 102' and the coolant that flows along the exterior surface of the fuel element as indicated by the dotted line arrows of FIGURE 2. Referring to FIGURES 2 and 5, end plug 48 is integrally formed and includes an elongated cylindrical shank 76 having a beveled end 78 for ease of insertion into receptacles 24 of the previously described lower tie plate 16. Referring to FIGURE 5, end plug 48 includes a cylindrical collar 80, having a diameter about equal to the outside diameter of tube 45', and inwardly extending end section 82. End section 82 is solid, has an external surface 84 that is shaped like the frustrum of a cone and has a flat inner surface 86 against which thermal wafer 102 rests. A tapered annular volume 88 is formed between external surface 84 and the internal surface of tube 45'. Bottom end plug 48 also includes cylindrical collar 90, having bottom surface 92 which rests against the surface surrounding receptacles 24 for supporting fuel elements 14. A circumferential slot 94 is provided between collars 80 and 90 to prevent the loss of heat from collar 80 during welding. Collar 80 may comprise part of the weld material. The welding operation will then consist of heating both collar 80 and the end of tube 45' to a temperature that exceeds their melting points thereby resulting in their fusion and forming a circular weld joint.

Figure 3:
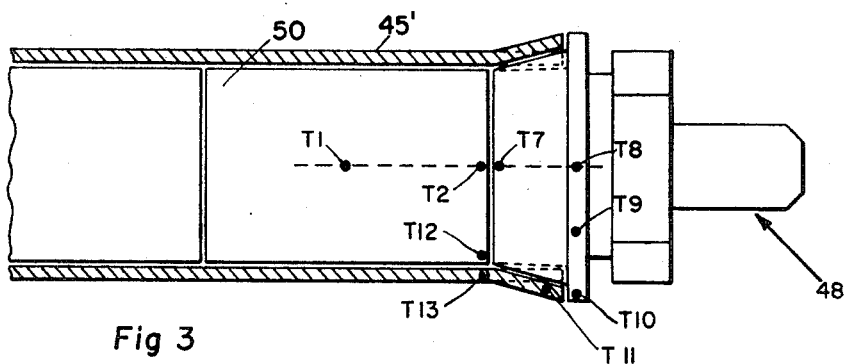
FIGURE 3 is an enlarged sectional view of the bottom end of a fuel element not incorporating the thermal wafers.
Figure 4:
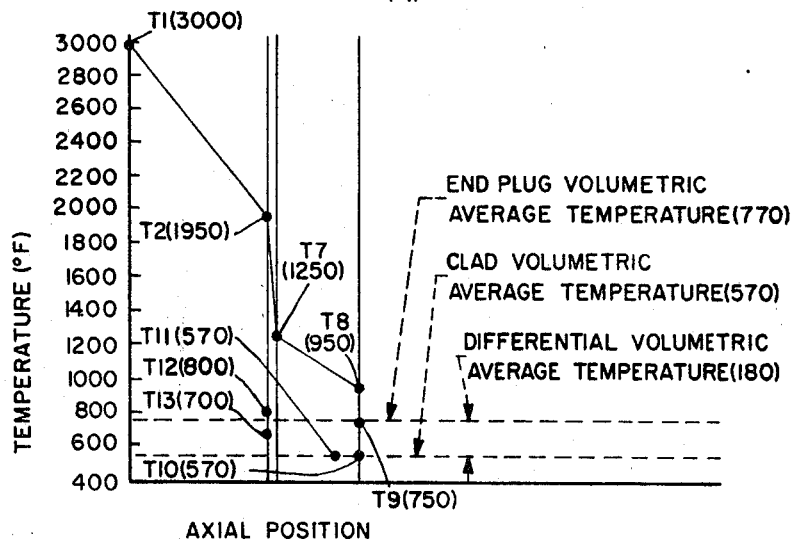
FIGURE 4 is a temperature diagram illustrating the temperature characteristics of the bottom fuel pellet, bottom end plug and associated fuel element clad of FIGURE 3.
Figure 7:
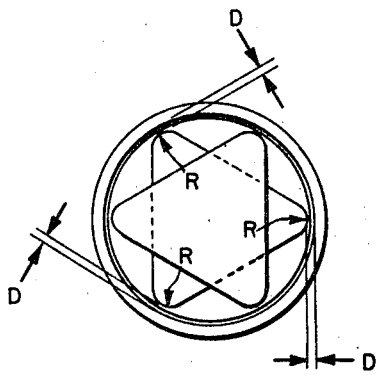
FIGURE 7 is an enlarged sectional view taken at section 7—7 of FIGURE 5.

In FIGURE 3 is illustrated an enlarged sectional view of the bottom end of a fuel element not incorporating thermal wafers 102 and illustrates fuel element swelling which may occur during reactor operation if thermal wafers are not employed. FIGURE 4 is a temperature diagram illustrating the temperatures of the fuel element of FIGURE 3 at various longitudinal and radial positions. In the following analysis it is assumed that the operating conditions of the reactor are such that the center of fuel pellet 50 is at a temperature $T_1$ of 3000° F. which is a typical operating condition.

Referring to FIGURE 3, the temperature $T_2$ at the center of the end of fuel element 50 has been found to be about 1950° F. when operating in the reactor and $T_1$ is 3000° F. As will hereinafter become apparent, the temperature $T_2$ is much lower than the equivalent temperature $T_2'$ (2250° F.) of the FIGURE 5 fuel element of the present invention. From FIGURES 3 and 4 it can be seen that the temperature drop ($T_2$ to $T_7$) across the gap formed between pellet 50 and end plug 48 is about 700° F. The center temperature $T_8$ of the end plug is about 950° F. and the radial temperatures $T_9$ and $T_{10}$ are about 750° F. and 570° F., respectively. With this set of temperature conditions the volumetric average temperature of end plug 48 in the weld region is about 770° F. It should be particularly noted, however, that the volumetric average temperature $T_{11}$ of the end of tube 45' is about 570° F. which is about 20° F. above the temperature of the water entering the fuel assembly and into heat exchange relationship with the fuel elements. From this it can be seen that the difference in volumetric temperature between the end of tube 45' and end plug 48 is about 180° F. This difference in volumetric average temperatures causes the end plug to expand a greater amount than the tube and results in the deformation shown in FIGURE 3 which is exaggerated for purpose of illustration. From operational and test experience it has been found that this deformation has weakened the weld and thereby resulted premature degradation of the weld. From this it was determined necessary to either decrease the volumetric average temperature of the end plug or increase the volumetric average temperature of the clad, or both. The maximum acceptable difference in volumetric average temperature has been found to be about 100° F.

There are practical problems preventing many solutions to this problem since it is highly important that the fuel column height be maintained at a minimum and that a completely reliable approach be used. Many different approaches to the solution of this problem have been considered. At the outset it was considered necessary to use a ceramic thermal barrier since ceramics had the low thermal conductivity necessary to provide both minimum heat transfer and minimum fuel column height. However, ceramics have the undesirable characteristic of mechanical cracking. Another approach was the insertion of a small sphere between the bottom fuel pellet and the end plug. While this was a reliable approach it consumed an excessive amount of axial height and was therefore of secondary utility. Another approach was the use of circular disks. Circular disks, however, were found to be deficient from a manufacturing standpoint since they frequently came to rest on their edges at the bottom of the fuel element. Various other thermal barriers were considered such as cones, cylinders, cup shaped wafers having a void, disks with a hole in the center, and the like. Although useful, these embodiments are not the preferred embodiment of the present invention.

Referring now to FIGURES 5 through 10 is illustrated the thermal wafers employed in the fuel element of the present invention. For purposes of comparing a fuel element not using thermal wafers (FIGURE 3) with one using thermal wafers (FIGURE 5), it is assumed that the fuel temperatures $T_1$ and $T_1'$ of these two figures are both 3000° F. As viewed in FIGURES 5, 7 and 8, thermal wafers 102 and 102', having the triangular shapes illustrated, are disposed between fuel pellet 50 and end plug 48. These thermal wafers are preferably made of either zirconium or 304 stainless steel, both of which have the necessary high strength, physics and chemical characteristics. However, these metals also have high heat conductivity which would ordinarily prevent their use as an effective heat barrier especially when axial column height is critical.

However, through experimental use it was found that sufficient temperature drop was obtained across these metal thermal wafers to provide an effective heat barrier. Only a small part of this temperature drop was due to the metal thermal wafers themselves since metal has a high heat conductivity. A large part of this temperature drop is believed to be due to the thermal interface regions or gaps A, B and C respectively formed between pellet 50 and wafer 102', between wafer 102' and wafer 102, and between wafer 102 and flat inner surface 86 of end plug 48. This is based on the premises that these thermal interface regions are filled with helium during initial operation of the fuel element in the reactor and then with helium and fission gases at later stages of operation. These gases have low heat conductivity relative to that of the metal thermal wafers and therefore the thermal interface regions act as an extremely effective heat barrier as will hereinafter become apparent.

Figure 6:
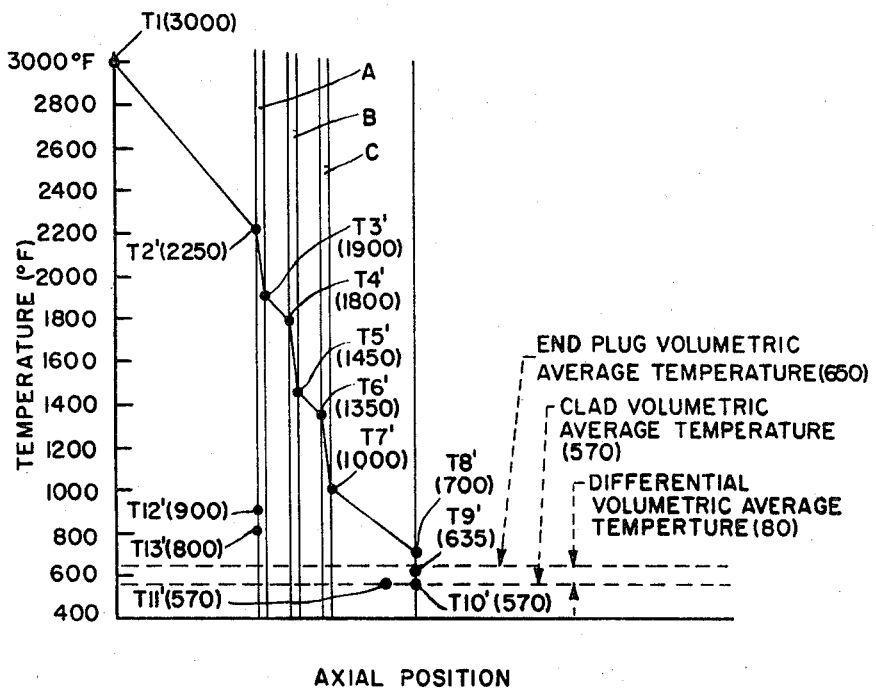
FIGURE 6 is a temperature diagram illustrating the temperature characteristics of the bottom fuel pellet, bottom end plug and associated fuel element clad and thermal wafers of FIGURE 5.

This thermal effect is shown in FIGURE 6 which is a temperature diagram that illustrates the temperature at indicated longitudinal and radial positions within the fuel element of FIGURE 5. The temperature $T_1'$ is 3000° F. The temperature $T_2'$ at the center of the end of fuel element 50 is 2250° F. which is about 300° F. higher than the temperature $T_2$ of the fuel element of FIGURE 3. The increase in temperature $T_2'$ is the direct result of the thermal heat barriers, created by thermal wafers 102 and 102', which redirects a portion of the axial heat flow through end plug 48 radially outward through the pellet and adjacent fuel element tube 45'. As shown in FIGURE 6 large temperature drops are obtained across the previously mentioned thermal interfaces as indicated by the temperature differences $T_2'-T_3'=350°$ F. (interface A), $T_4'-T_5'=350°$ F. (interface B), and $T_6'-T_7'=350°$ F. (interface C). It can also be seen that the temperature drop across each of thermal wafers 102 and 102' is only 100° F. which is insufficient to prevent tube swelling. The center and radial temperatures of end plug 48 are $T_8'=700°$ F., $T_9'=635°$ F. and $T_{10}'=570°$ F. which result in an end plug volumetric average temperature adjacent the weld region of about 650° F. as indicated in FIGURE 6. This provides a differential volumetric average temperature between the tube and end plug of about 80° F. which is sufficiently small to effectively prevent excessive differential swelling and thereby prevent damage to the weld.

Figure 8:
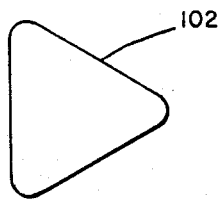
FIGURE 8 is a top view of a thermal wafer made in accordance with the present invention.
Figure 9:
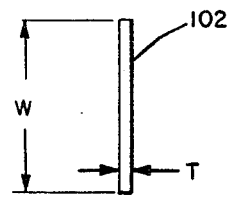
FIGURE 9 is a side elevation of the thermal wafer shown in FIGURE 8.

As best depicted in FIGURES 8 and 9 the preferred shape of the thermal wafer of the present invention is that of an equilateral triangle having each of the apexes rounded. It is to be understood that different triangular shapes may be employed provided the selected shape is compatible with its intended function. In addition, the thermal wafer is made thin so that several may be stacked to provide a greater heat barrier, due to the thermal interfaces, than would fewer thick thermal wafers having the same total height. Although the dimensions of the thermal wafers of the present invention will vary depending upon their use, typical dimensions of the thermal wafer as related to the fuel tube shown in FIGURES 5, 7, 8 and 9 are as follows:

|   | Inch |
|---|---|
| Fuel tube (inside diameter) | 0.498 |
| Clearance (D) | 0.010 |
| Radius (R) | 0.063 |
| Thickness (T) | 0.030 |
| Width (W) | 0.40 |

From this it can be seen that an effective thermal barrier is provided by metal thermal wafers having a high heat conductivity. As previously indicated it is particularly important that the fuel column height be kept to a minimum and this is possible with the metal wafers of the present invention since the height of a plurality of stacked thin metal wafers, having thermal interfaces therebetween, is considerably less than the height of a single metal member providing the same thermal resistance.

It should also be noted that should the fuel pellet crumble and fill the annular space formed between the periphery of the wafers and the fuel element tube that this will not create a higher differential volumetric temperature since the peripheral temperature $T_{12}'$ of the fuel is cooler than is the center temperature $T_2'$.

As shown in the segmented fuel element of FIGURE 2, a single metal wafer 103 may be used to prevent excessive differential swelling between connector 44 and the adjacent tube. Wafer 103 also serves to prevent fuel pellet particles from dropping through opening 72 and thereby filling plenum 104 of the next lower segment.

As previously indicated, various shaped thermal barriers have been considered and tried, however, the preferred form is the triangular wafer illustrated in FIGURES 8 and 9. It is to be understood that this wafer not only provides the above described thermal functions but its shape is particularly suitable for manufacturing operations. Referring to FIGURES 10A, 10B, 10C and 10D is illustrated the insertion of these thermal wafers into a fuel element (a typical length being 12 feet) during a typical manufacturing operation. Thermal wafers 102 and 102' respectively illustrate the two possible positions which wafers may occupy while riding down the fuel element tube. As illustrated in FIGURE 10A, wafer 102 is riding down an angularly disposed fuel element with the apex region 106 riding on the bottom side of the fuel element tube and behind apex regions 107 and 108 which are riding along the opposite sides of the fuel element tube. These wafers occupy this position while riding down the tube when any two apex regions are initially inserted into the fuel element tube. Thermal wafer 102' is illustrated as having apex region 106' riding on the bottom of the fuel element but ahead of apex regions 107' and 108' which are riding along the opposite sides of the fuel element. Wafers occupy this position while riding down the tube when any single apex region is initially inserted into the tube.

Referring to FIGURE 10B, side 110 of wafer 102 will initially strike the face of the end plug 48. When this occurs, side 110 will slide across the face of the end plug and apex 106 will continue to slide downward along the side of the tube. This simultaneous sliding action of side 110 and apex 106, as indicated by the arrows in FIGURE 10B, will continue until the wafer is flat against the face of the end plug, as indicated in FIGURE 10C. Wafer 102', having apex 106' ahead of side 110', has a different action from that of wafer 102 when it strikes the end plug or a wafer resting against the end plug. In this situation apex 106' will initially strike the face of the end plug or wafer 102 and then rotate about apex 106' as illustrated by the arrow in FIGURE 10C. This rotation will continue until the wafer is flat against the face of the end plug or wafer 102 as illustrated in FIGURE 10D.

It has been found that circular wafers slide down the fuel element such that their faces are parallel to the longitudinal axis of the fuel element and frequently come to rest on their edges at the bottom of the fuel element. Therefore, when fuel pellet 50 is inserted into the fuel element it will strike against the top edge of the circular disk. This may result in either excessive spacing of the pellet from the end plug or fracture of the pellet. The former results in excessive fuel column height which affects the reactor physics. The latter results in breaking the pellet which may cause excessive pellet spacing or direct contact of the pellet with the end plug. As described above, this problem is overcome by using the triangular wafers of the present invention.

In certain instances it may be desirable to initially fasten the thermal wafers to the face of the bottom end plug and then weld the end plug to the clad. This fastening may be performed by riveting (through a central opening provided in each of wafers 102 and 102') the wafers to the end plug or by the use of other connection techniques.

The width (W) to thickness (T) ratio ($W/T$), see FIGURE 9, of the thermal wafer of approximately 13 has been found suitable for use in fuel elements having the previously described dimensions. It is to be understood, however, that this ratio and other dimensions and shapes may be departed from to accommodate particular needs. This departure will depend upon many factors such as the cost of manufacturing many thermal wafers having a large $W/T$ ratio, the ease of loading thermal wafers, the required degree of thermal resistance, the particular wafer metal, the particular wafer shape, the fuel element inside diameter, the maximum allowable increase in fuel column height, and other considerations which will be apparent to those skilled in the art.

Various embodiments of this invention have been described and it should be understood that various other modifications and adaptations thereof may be made by those skilled in this particular art without departing from the spirit and scope of this invention as set forth in the following claims.

What is claimed is:

1. A fuel element for a nuclear reactor including an elongated tube, nuclear fuel disposed in at least a part of said elongated tube, a first end plug connected to one end of said elongated tube, a second end plug connected to the other end of said elongated tube, means for increasing the thermal resistance of the heat path from said nuclear fuel to said second end plug relative to the thermal resistance of the heat path from said nuclear fuel to said tube, said means comprising at least one thin unbonded metal wafer having substantially coextensive surfaces and having a thickness substantially less than its width disposed in said elongated tube between said nuclear fuel and said second end plug to provide a first thermal interface between said wafer and said nuclear fuel and a second thermal interface between said wafer and said second end plug, said first and second thermal interfaces reducing the quantity of heat transferred from said nuclear fuel to said second end plug whereby the difference in volumetric expansion of said second end plug and said other end of said tube adjacent said second end plug is sufficiently small during operation of said fuel element in said nuclear reactor to prevent excessive stresses from being formed in the connection between said second end plug and said other end of said elongated tube, there being at least one less thermal interface between said fuel and said elongated tube than between said fuel and said second end plug.

2. The fuel element of claim 1 wherein said wafer has a width-to-thickness ratio greater than 10.

3. The fuel element of claim 1 wherein said wafer has a maximum dimension less than the inside diameter of said tube and wherein said wafer has at least three apexes.

4. The fuel element of claim 1 wherein said wafer comprises an equilateral triangle configuration wherein each of the apexes is rounded.

5. The fuel element of claim 1 wherein said wafer is formed of type 304 stainless steel and has two flat and substantially parallel surfaces separated by a distance of about 0.030 inch, each of said flat surfaces having an about equilateral triangle shape with each of the apexes of said triangle having a rounded shape with a radius of curvature of about 0.06 inch.

6. The fuel element of claim 1 wherein a plurality of said wafers are disposed between said fuel and said second end plug to provide additional thermal interfaces between adjacent wafers.

7. The fuel element of claim 1 wherein said fuel element comprises a plurality of segments each of which contains nuclear fuel, a metal connector interconnecting adjacent segments of said fuel element, a thin unattached flat metal wafer having a thickness substantially less than its width disposed between said nuclear fuel and said connector of each of said segments for reducing the quantity of heat transferred from said nuclear fuel to each of said connectors.

8. A fuel element for a nuclear reactor comprising a plurality of segments each containing a nuclear fuel within a cladding, a metal connector interconnecting adjacent segments of said fuel elements, means for increasing the thermal resistance of the heat path from said nuclear fuel to said connector relative to the thermal resistance of the heat path from said nuclear fuel to said cladding, said means comprising at least one thin unbonded metal wafer having substantially coextensive surfaces and having a thickness substantially less than its width disposed between said connector and the nuclear fuel in at least one of said segments, said wafer providing a first thermal interface between said nuclear fuel and said wafer and a second thermal interface between said wafer and said connector for reducing the quantity of heat transferred from the nuclear fuel to said connector; whereby the difference in volumetric expansion of said connector and the adjacent cladding is sufficiently small during operation of said fuel element in said nuclear reactor to prevent excessive stresses from being formed in the connection between said connector and said cladding; there being at least one less thermal interface between said fuel and the cladding than between said fuel and said connector.

9. The fuel element of claim 8 wherein said wafer has an odd number of sides forming at least three apexes.

References Cited
UNITED STATES PATENTS

| | | | |
|---|---|---|---|
| 2,952,603 | 9/1960 | Boller et al. | 176—79 |
| 3,037,924 | 6/1962 | Creutz | 176—68 |
| 3,145,150 | 8/1964 | Gylfe | 176—72 X |
| 3,189,525 | 6/1965 | Davis | 176—79 X |
| 3,212,988 | 10/1965 | Ringot | 176—67 |
| 3,222,256 | 12/1965 | Fletcher et al. | 176—79 |
| 3,268,411 | 8/1966 | Alfille et al. | 176—67 X |
| 3,274,067 | 9/1966 | Greebler et al. | 176—74 X |
| 3,296,864 | 1/1967 | Kealy et al. | 176—68 X |
| 3,309,283 | 3/1967 | Alfille et al. | 176—68 X |
| 3,325,375 | 6/1967 | Mogard | 176—67 |

BENJAMIN R. PADGETT, Primary Examiner

MELVIN J. SCOLNICK, Assistant Examiner

U.S. Cl. X.R.

176—74, 79